United States Patent Office.

C. S. HUNT, OF PARISH OF TERREBONNE, AND JACOB B. KNIGHT, OF PARISH OF ORLEANS, ASSIGNORS TO C. S. HUNT, AND WILLIAM F. PRATT, AND PETER M. PETERSON, OF NEW ORLEANS, LOUISIANA.

Letters Patent No. 77,983, dated May 19, 1868.

IMPROVED ILLUMINATING-GAS.

The Schedule referred to in these Letters Patent and making part of the same.

TO ALL WHOM IT MAY CONCERN:

Be it known that we, C. S. HUNT and JACOB B. KNIGHT, the first of the parish of Terrebonne, and the second of the parish of Orleans, in the State of Louisiana, have invented a certain new and useful Composition or Compound of Gaseous Matter to be Used for Illuminating or Lighting Purposes; and we do hereby declare the following to be a full, clear, and exact description of our method of compounding or uniting the ingredients composing the same, and of using or applying the compound to practice.

In order that the great value and importance of our invention may be fully understood, it is necessary, before entering upon a description of it, as an entirety or organic whole, to refer briefly to the principal ingredient, the same constituting the base of our said invention, in its separate and normal state, and to indicate its nature and origin. This ingredient is the gas familiarly known and distinguished by the name of "marsh-gas," and which is of natural or spontaneous production in many parts of the world. Particularly is it found in very great quantity in the State of Louisiana, portions of Texas, Arkansas, Mississippi, and Alabama, as well as other localities in the United States of similar geological formation.

The composition of this gas, according to the best analysis of which we have at present any knowledge, is as follows: Marsh-gas, (hydride of methyle,) 91.81; nitrogen, 5.32; carbonic acid, 2.87.

In the localities to which we have above referred, this natural gas is rapidly and continually evolved, on an opening being made through the overlying stratum of earth, from a substratum of decomposing vegetable matter, varying, as far as has been thus far definitely ascertained, from four to forty feet in depth or thickness, and extending, there are good reasons for believing, over an area that is coextensive with the alluvial regions of the United States, if, indeed, its extent does not go beyond such limits. The overlying mass of earth or surface stratum is also of varying thickness, and, in consequence of its closely-compacted condition and its tenacious and cohesive nature, it is impervious to the gas, which, hence, cannot escape or rise through this stratum unless artificial conduits or vents are created for its passage.

This gas, whilst sufficiently inflammable, and giving out great heat in the process of its combustion, in its natural state, as will be seen from the analysis above given, is totally unfit and worthless for illuminating uses, in consequence of the want of a sufficient quantity of carbon; and for this and other reasons connected with the difficulty of keeping open the channels made for its issue, notwithstanding that it is continually given out in undiminished volumes so long as there is an unobstructed conduit for its issue, has never yet been applied to illuminating, nor, indeed, to any other useful object whatsoever.

Now, we have discovered that the absent or required carbon can be easily supplied by simply causing the gas, before it reaches the point at which it is applied to use, to pass through a bath of gasoline, oil, or spirits of turpentine, or some other equivalent carburetting-fluid; or, it may be, the same result would follow the mere passage of the gas through the upper part of a vessel partly filled with hydrocarbon, without actually forcing it through the latter, by a surface contact therewith.

Our invention, therefore, it will be perceived, consists of carburetting natural or marsh-gas by an infusion of carbon therein through the agency of hydrocarbons; or, in other words, our invention is carburetted marsh-gas, when the carbon is infused into or added to the same through the instrumentality of a hydrocarbon bath.

The hydrocarbon employed to effect the infusion should always be sufficient in quantity to impart all the carbon to the gas which the latter is capable of taking up, although an incorporation of twenty-five or thirty per cent. into the body of the gas is enough for all practical purposes. This we have demonstrated by experiment and comparison with the gas that is used for lighting this city, (New Orleans,) the result of the comparative trials being that the natural gas, when improved by the addition of the above per centum—we refer to its own bulk—of carbon, exhibited an illuminating power greatly transcending that possessed by the city gas.

After carburetting the marsh-gas in the manner described, it is applied to use in the same way and by the same appliances as in the case of ordinary artificially-created gas, and hence there is no need to describe the one or the other.

Our invention makes available a product of nature that has never heretofore been considered susceptible of application to any useful purpose; and in precise proportion to the wide-spread area in which this product is found, and the enormous measure of its spontaneous evolution, will be the beneficial effects resulting from our invention. Every city, town, village, hamlet, dwelling-house, and workshop in the State of Louisiana, and other localities of like alluvial formation, may be lighted from the vast storehouse of gas nature has provided, by means of our invention, and at so trifling a cost that it may almost literally be said to amount to nothing, since, after the first small outlay of money incident to the sinking a receiver into the gas-burning stratum, which is provided with a pipe for the passage of the gas above ground, there is no further expense beyond what will be entailed by an occasional renewal of the hydrocarbon employed in the creation of our new gaseous compound.

Having thus described our invention, what we claim, and desire to secure by Letters Patent, is—

The gaseous composition or compound herein described, consisting of marsh-gas, commonly so called, and carbon, when the latter is infused or incorporated into the former, substantially in the manner and for the purpose set forth.

C. S. HUNT,
J. B. KNIGHT.

Witnesses:
H. N. JENKINS,
LYMAN HARDING.